United States Patent [19]
Hirose

[11] Patent Number: 5,829,410
[45] Date of Patent: Nov. 3, 1998

[54] DEVICE FOR CONTROLLING IGNITION TIMING IN AN INTERNAL COMBUSTION ENGINE

[75] Inventor: Kiyoo Hirose, Susono, Japan

[73] Assignee: Toyota Jidosha Kabushiki Kaisha, Toyota, Japan

[21] Appl. No.: 828,348

[22] Filed: Mar. 28, 1997

[30] Foreign Application Priority Data

Apr. 23, 1996 [JP] Japan .................................. 8-101636

[51] Int. Cl.$^6$ ...................................................... F02P 5/14
[52] U.S. Cl. .......................... 123/421; 123/422; 123/423; 123/407
[58] Field of Search .................... 123/421, 422, 123/423, 407

[56] References Cited

U.S. PATENT DOCUMENTS

| | | | |
|---|---|---|---|
| 5,289,808 | 3/1994 | Takahashi et al. | 123/421 |
| 5,309,882 | 5/1994 | Hoshiba et al. | 123/339 |
| 5,327,868 | 7/1994 | Witkowski et al. | 123/421 |
| 5,357,927 | 10/1994 | Saito et al. | 123/421 |
| 5,619,967 | 4/1997 | Streib | 123/399 |

FOREIGN PATENT DOCUMENTS

| | | | |
|---|---|---|---|
| A 1-190969 | 8/1989 | Japan | 123/421 |
| A 7-293413 | 11/1995 | Japan | 123/421 |

*Primary Examiner*—Raymond A. Nelli
*Attorney, Agent, or Firm*—Oliff & Berridge, PLC

[57] ABSTRACT

A device for controlling ignition timing in an internal combustion engine which can provide change of output as demanded.

8 Claims, 7 Drawing Sheets

BASIC IGNITION TIMING

DEVICE FOR CONTROLLING IGNITION TIMING IN AN INTERNAL COMBUSTION ENGINE

BACKGROUND OF THE INVENTION

1. Field of the Invention

The present invention relates to a device for controlling ignition timing and, particularly, to a device for controlling ignition timing of an internal combustion engine for an automobile.

2. Description of the Related Art

According to a known device for controlling the ignition timing of an internal combustion engine for an automobile, the ignition timing is promptly shifted to a target ignition timing when there is a small change in the load exerted on the engine, and the ignition timing is shifted to the target ignition timing with the lapse of time when there is a large change in the load exerted on the engine (Japanese Unexamined Patent Publication (Kokai) No. 1-190969).

During cold starting, in order to promote warm-up, the engine is operated in the so-called fast idling state in which a larger amount of air is introduced than that in the ordinary idling state after warm-up has occurred. In this case, in order to increase the temperature of the combustion gas, the ignition timing is greatly retarded from the ignition timing for ordinary idling. For instance, after the engine is warmed up, the ignition timing is about 10° CA BTDC (before top dead center) during the idling operation condition. However, the ignition timing is brought to about 10° CA ATDC (after top dead center) in order to efficiently warm up the engine and the catalyst installed in the exhaust system.

Even during the warming-up operation, however, the ignition timing may be brought close to the ignition timing for the warmed-up state in order to obtain output under operating conditions other than idling.

In a light-load operation condition during the warming up, furthermore, the ignition timing is about 15° CA BTDC. In the heavy-load operation condition, however, the ignition timing may be set to be about 7° CA BTDC.

Here, the case where the accelerator pedal is slightly pressed in the fast idling state for warm-up is compared with the case where the accelerator pedal is slightly pressed in ordinary idling. When the accelerator pedal is slightly pressed in ordinary idling, a small amount of intake air for the idling operation condition is increased by an amount of the intaken air created as a result of slightly pressing the accelerator pedal. That is, the amount of the air does not increase much, and no torque shock occurs.

When the accelerator pedal is slightly pressed in the fast idling in warming-up, the larger amount of the intake air for the fast idling is further increased. When the ignition timing is brought to the optimum timing for the state where the amount of the intake air is thus doubly increased, therefore, a large torque, which is much different from the torque in the fast idling, is produced.

When the ignition timing is quickly brought to an optimum timing as in the above-mentioned publication, therefore, an unexpected change in the torque will occur and it will deteriorate the drivability of the vehicle.

When the accelerator pedal is greatly pressed in the fast idling in the warming-up, the driver desires a quick increase in torque regardless of the occurrence of torque shock. In this case, when the ignition timing is slowly brought to an optimum timing like in the above-mentioned publication, the expected torque increase will not be obtained and the drivability is again deteriorated.

In another device, the retard angle is reduced with changing the reduction rate when the engine operating condition is changed from idling to non-idling. That is, the retard angle is quickly reduced at the beginning of the reduction, and slowly reduced later (Japanese Unexamined Patent Publication No. 7-293413).

A device which has a feature to reduce the retard angle quickly when the required advance is great in addition to the above described feature is also disclosed in the same publication. This device, however, reduces the retard angle slowly when the required advance is small. However, the additional feature does not affect the feature to reduce the retard angle quickly at the beginning.

Therefore, an unsuitable advance of ignition timing, which may cause unexpected change of torque, will occur in this device.

SUMMARY OF THE INVENTION

In view of the above-mentioned problems, the object of the present invention is to provide a device for controlling the ignition timing with which the driver can still obtain an expected change in torque.

According to the present invention, there is provided a device for controlling the ignition timing of an internal combustion engine which comprises an operating condition detecting means for detecting an operating condition of the engine which includes demand level detecting means for detecting the level of operator's demand for output, an ignition timing calculating means for calculating ignition timing based upon the detected operating condition of the engine, and an ignition timing adjusting means for adjusting the ignition timing to the calculated ignition timing. The ignition timing adjusting means adjusts the ignition timing quickly when the demand level detecting means detects that the operator demands a large change of output, and adjusts the ignition timing slowly when the demand level detecting means detects that the operator demands only a small change of output.

The present invention may be more fully understood from the description of preferred embodiments of the invention set forth below, together with the accompanying drawings.

DESCRIPTION OF THE PREFERRED EMBODIMENTS

Figure 1:
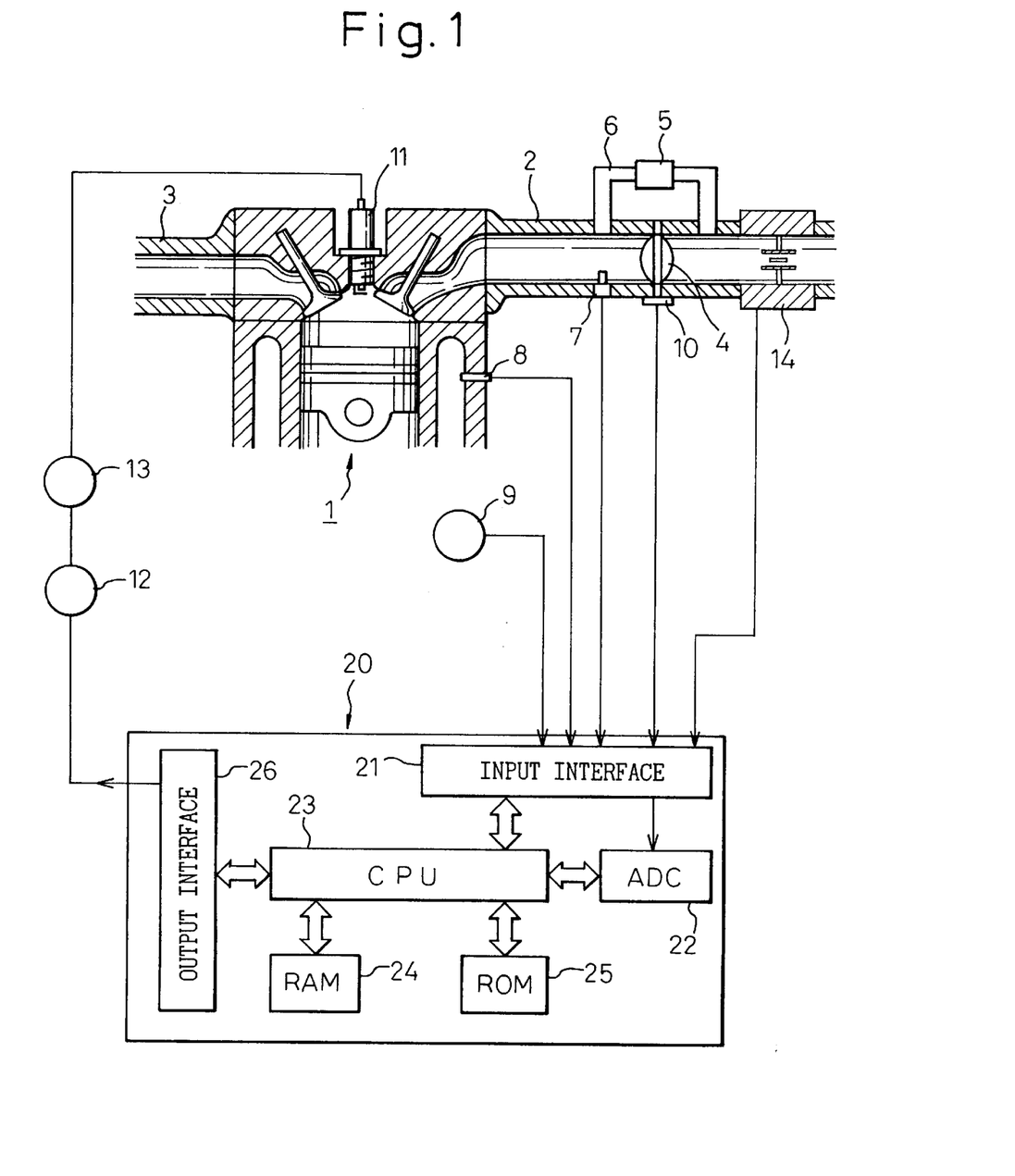
FIG. 1 is a diagram schematically illustrating the structure of an embodiment according to the present invention.

FIG. 1 schematically illustrates the constitution of the embodiment of the present invention, wherein reference numeral 1 denotes an engine body to which is adapted a device for controlling the ignition timing of the present invention, 2 denotes an intake manifold, 3 denotes an exhaust pipe, 4 denotes a throttle valve, and reference numeral 5 denotes an idle speed control valve (hereinafter referred to as ISCV) which controls the amount of intake air through a by-pass air passage 6 during the idling.

Reference numeral 7 denotes a pressure sensor for detecting an intake manifold pressure PM, 8 denotes a coolant temperature sensor for detecting a temperature of the engine coolant, and 9 denotes an engine speed sensor for detecting the engine speed. Reference numeral 10 denotes a throttle sensor for detecting a throttle valve opening angle TA, which also works as an idle switch to determine whether the engine is in the idling condition or in the non-idling condition.

Reference numeral 11 denotes a spark plug, 12 denotes an igniter, and 13 denotes a distributor.

Reference numeral 14 denotes an air flow meter for detecting intake air amount GN.

For the operation regarding the present invention only one sensor is required among the pressure sensor 7, the throttle sensor 10 and the air flow meter 14 for detecting a parameter of load.

Reference numeral 20 denotes an engine control unit (hereinafter referred to as ECU) which comprises a digital computer and includes an input interface circuit 21, an ADC (analog-to-digital converter) 22, a CPU (microprocessor) 23, a RAM (random access memory) 24, a ROM (read-only memory) 25, and an output interface circuit 26, which are connected to each other.

The CPU 23 receives output signals from the sensors such as the pressure sensor 7, the coolant temperature sensor 8, the engine speed sensor 9 and the throttle sensor 10 through the input interface circuit 21, and the ADC 22 as required.

Based upon the values of the sensors and stored data in the ROM 25, the CPU 23 executes the operation that will be described later and outputs a signal for igniting the spark plug 11 at suitable timing. The signal is sent to the igniter 12 through the output interface circuit 26 so that ignition voltage is applied to the spark plug 11 from the igniter 12 through the distributor 13.

Prior to describing the operation of the embodiment constituted as described above, the concept thereof is described below with referring to FIG. 2.

Figure 2:
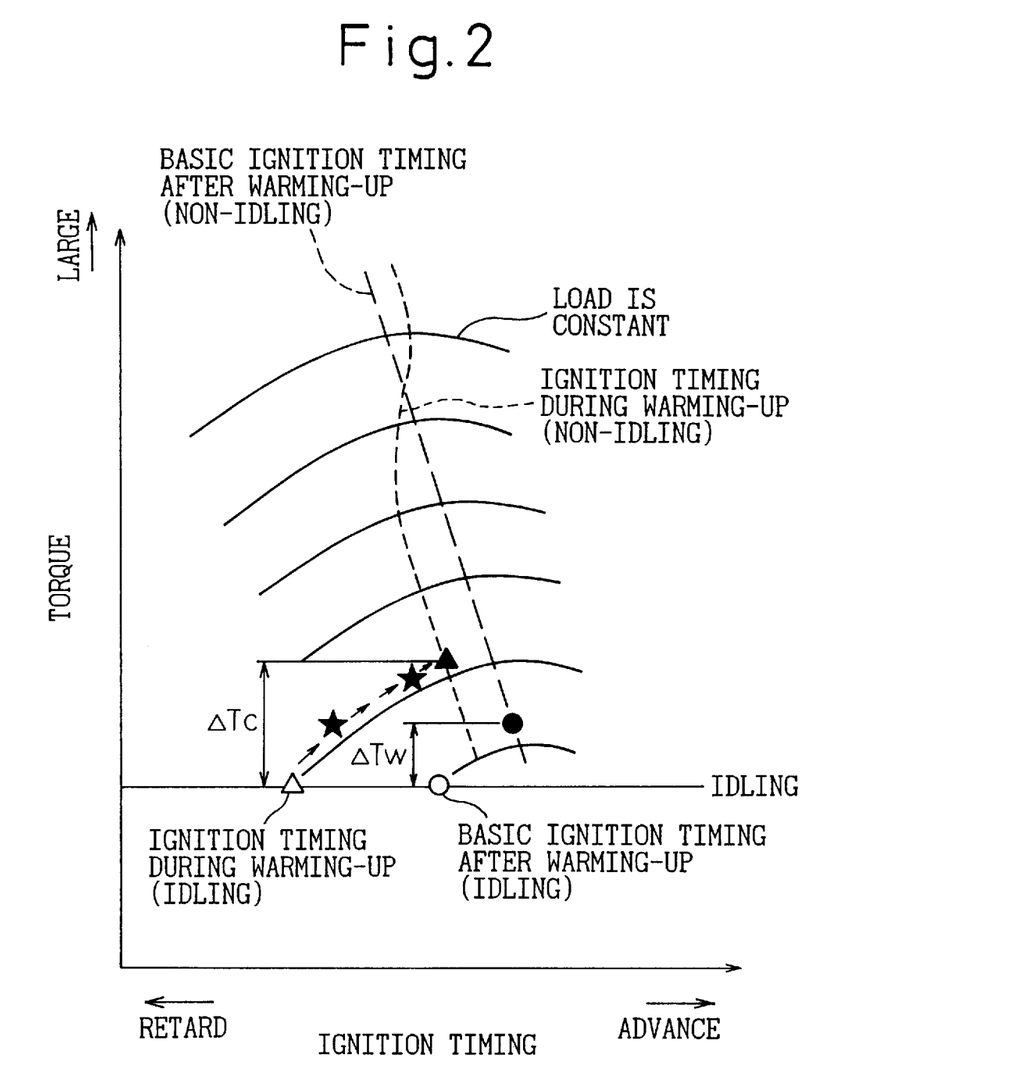
FIG. 2 is a diagram illustrating the idea of the present invention.

Referring to FIG. 2, the abscissa represents the ignition timing, the ordinate represents the output torque of the engine, and solid lines represent changes in the torque when the ignition timing is changed while the amount of intake air is the same.

In FIG. 2, a circle "○" represents a basic ignition timing during the idling, and a broken line represents basic ignition timings in the non-idling region for operation after warm-up.

The ignition timing is corrected for operation during the warm-up. During the idling warm-up the engine is operated at an ignition timing represented by a triangle "△" and during the non-idling warming up the engine is operated at an ignition timing represented by a dotted line.

The correction value varies depending upon the temperature of the engine coolant. Therefore, FIG. 2 shows an example at a certain temperature.

When the accelerator pedal is pressed in the idling after warmed up, therefore, the ignition timing changes from the position of the circle "○" to a position of a black dot "●", and the torque change ΔTw is small.

During the warm-up by fast idling, on the other hand, the amount of the intake air is larger than that during idling after warm-up. When the accelerator pedal is pressed in this state, therefore, the ignition timing immediately jumps to a position of a black triangle "▲" unless the present invention is employed, and the torque change ΔTc becomes large.

According to the present invention, therefore, the ignition timing is changed so as to pass the states represented by stars "★" before it arrives at "▲" as indicated by arrows in order to decrease the torque change. This is accomplished by an operation controlled by a flow chart shown in FIGS. 3 and 4.

Figure 3:
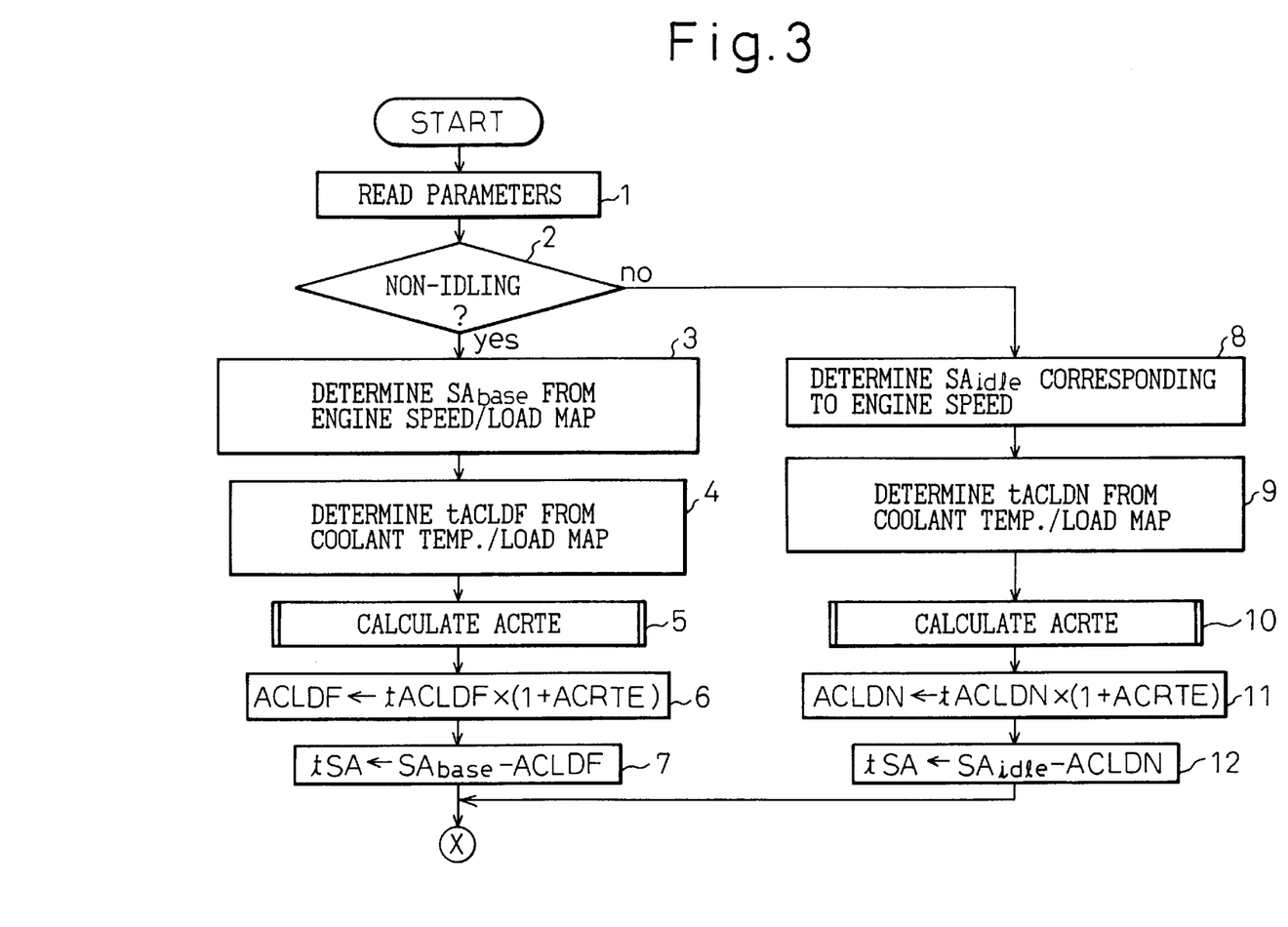
FIG. 3 is a flow chart for controlling the ignition timing according to the present invention.
Figure 4:
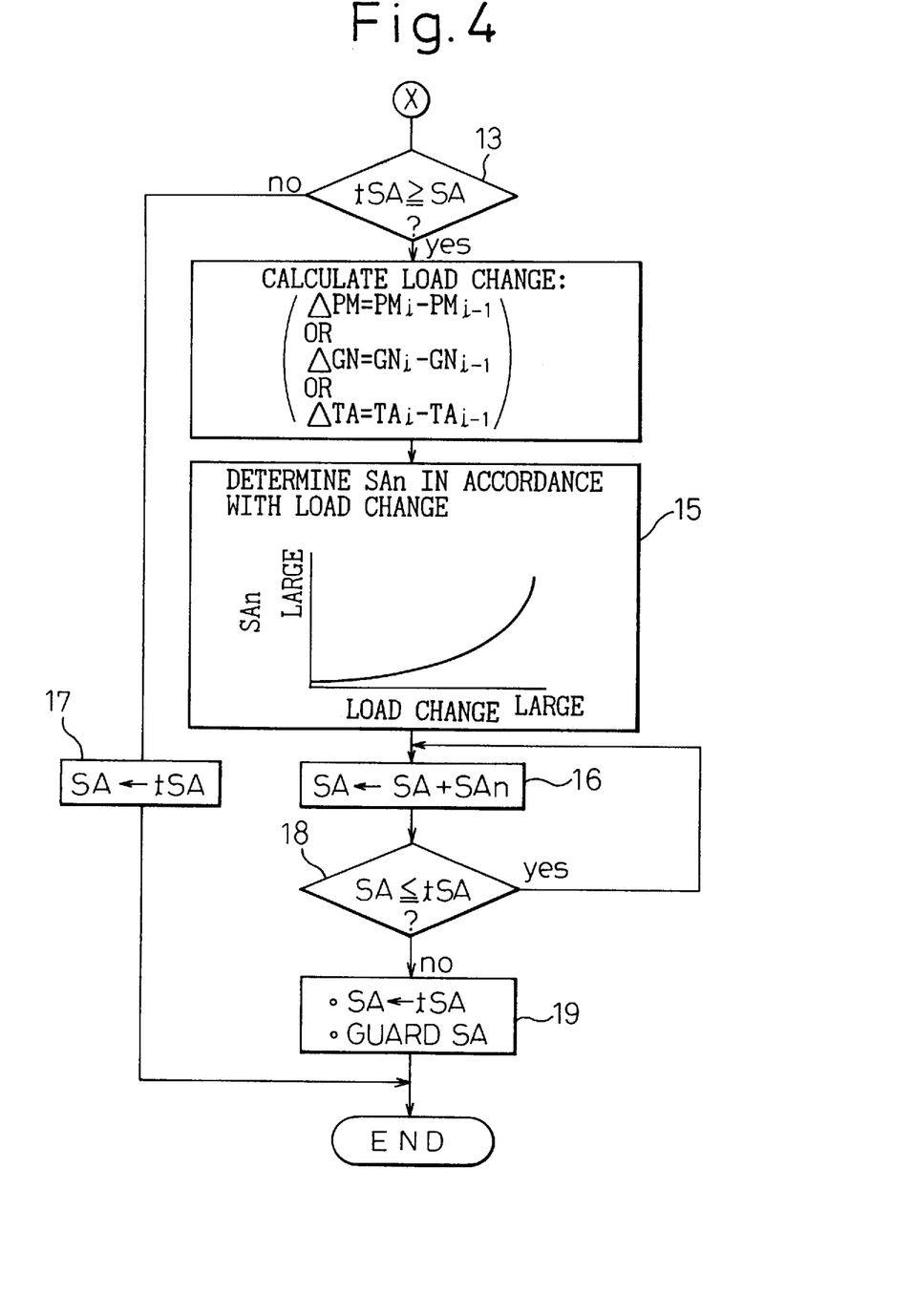
FIG. 4 is a flow chart for controlling the ignition timing according to the present invention.

Described below in detail is the flow chart of FIGS. 3 and 4. The routine shown in this flow chart is executed by the main routine for operating the ignition timing.

At step 1, various parameters such as the engine speed NE, the intake manifold pressure PM or the intake air amount GN or the throttle valve opening angle TA as a parameter of load, the coolant temperature THW, an idle switch signal LL, etc. are read. At step 2, it is determined whether the engine is in the idling or in the non-idling based upon the data read at step 1. The routine proceeds to a step 3 when the engine is in the non-idling condition.

Figure 5:
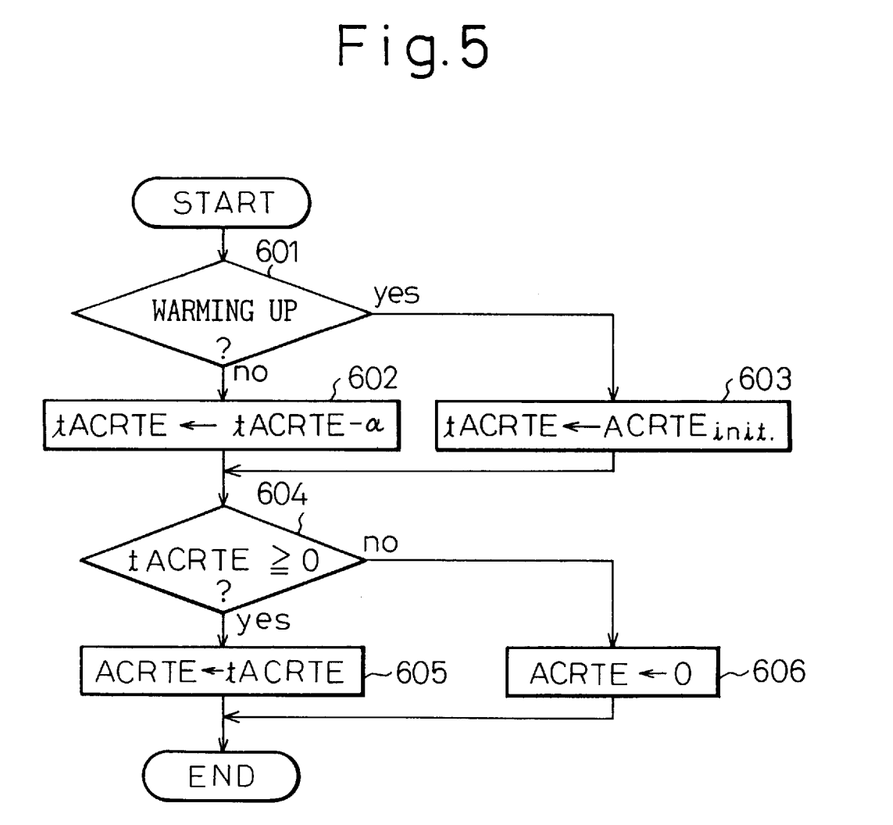
FIG. 5 is a flow chart for controlling the ignition timing according to the present invention.
Figure 6:
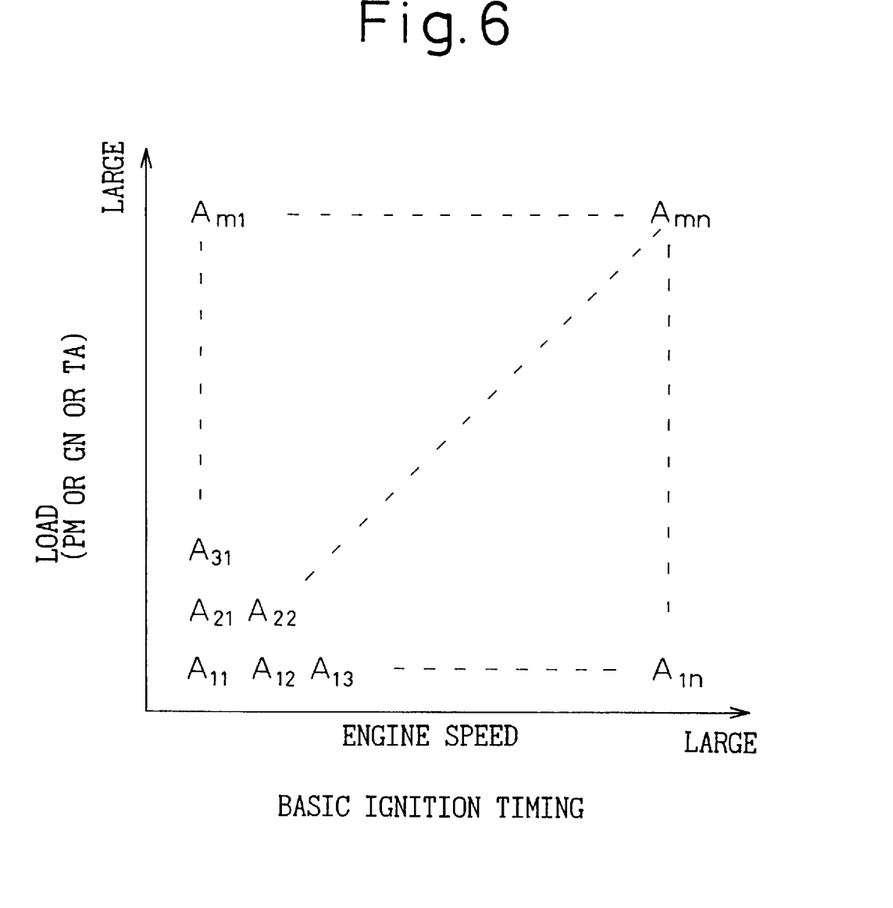
FIG. 6 is a diagram illustrating a map of basic ignition timings stored in a ROM.
Figure 7:
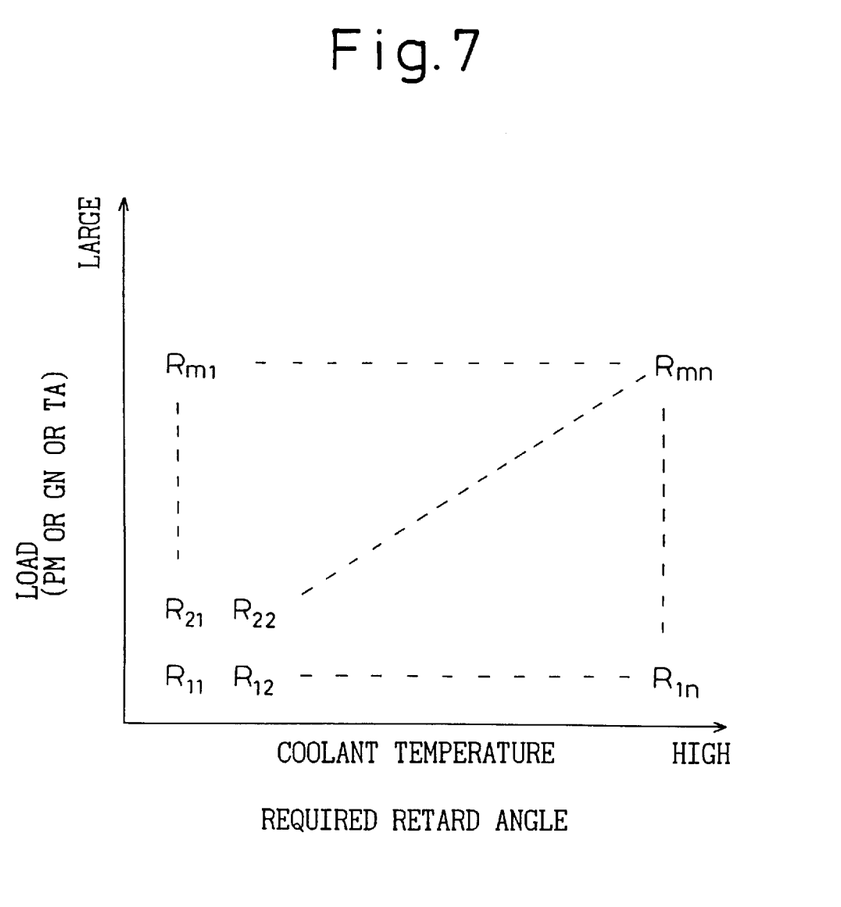
FIG. 7 is a diagram illustrating a map of required retard angle stored in the ROM.

When the engine is in the non-idling state, and the routine proceeds to the step 3, a basic ignition timing $SA_{base}$ corresponding to the engine speed NE and the intake manifold pressure PM or the intake air amount GN, or the throttle valve opening angle TA is determined from a map (see FIG. 6). At step 4 a required retard angle tACLDF corresponding to the coolant temperature THW and the intake manifold pressure PM or the intake air amount GN, or the throttle valve opening angle TA, is calculated from a map (see FIG. 7). The practical retard angle ACLDF is determined at step 6 from the required retard angle tACLDF found at step 4 and the retard reflection factor ACRTE found at step 5. The retard reflection factor ACRTE is employed to correct the required retard angle tACLDF found at step 4 corresponding to whether the engine is warming up or has warmed up. The detail of the calculation of the retard reflecting factor ACRTE is described later with reference to a flow chart shown in FIG. 5. At step 7, a target ignition timing tSA for the non-idling condition is found by subtracting the practical retard angle ACLDF found at step 6 from the basic ignition timing $SA_{base}$ found at step 3.

When it is determined at step 2 that the engine is in the idling condition, the steps 8 to 12 are executed to find a target ignition timing tSA in the idling condition.

Thus, in steps 4 to 7 and in steps 9 to 12 the correction values are calculated to find the target ignition timing tSA from the basic ignition timing $SA_{base}$.

At step 13, a new value, i.e. a value for the present execution tSAi of the target ignition timing tSA is compared with old, i.e. previous practical ignition timing SA. When tSAi is more advanced than SA, the routine proceeds to step 14. When tSAi is more retarded, the routine proceeds to step 17.

At step 14, the load change is found.

At step 15 an advancing angle SAn is determined in accordance with the amount of the load change found at step 14 in such a manner that the advancing angle SAn is small when the load change is small, and the advancing angle SAn is large when the load change is large. At step 16, the advancing angle SAn found at step 15 is added to the target ignition timing tSA found at step 7 or 12 to obtain new practical ignition timing SA for the present time and the routine proceeds to step 18.

If, on the other hand, the target ignition timing tSA is more retarded than, or is equal to, the previous practical ignition timing SA at step 13, and proceeds to step 17, the target ignition timing tSA is set as the new practical ignition timing SA to be executed this time and the routine ends.

At step 18, the new practical ignition timing SA is compared with the target ignition timing tSA. The routine return to step 16 when the practical ignition timing SA is smaller, i.e. more retarded, than the target ignition timing tSA. When the practical ignition timing SA is more advanced than the target ignition timing tSA, the routine ends after executing the process for bringing the target ignition timing tSA to the practical ignition timing SA and for guarding the upper limit of the advanced angle at step 19.

FIG. 5 is a flow chart of a routine for calculating the retard reflection factor ACRTE used at steps 5 and 10. This routine is executed every second.

At a step 601, it is determined whether or not the engine is warmed up. When the engine is not warmed up, the routine proceeds to a step 602 where a predetermined value α is subtracted from the present retard reflection factor tACRTE and the routine proceeds to a step 604. When the engine is warmed up, the routine proceeds to a step 603 where an initial value $ACRTE_{init}$ of the retard reflection factor is used as a present value of the retard reflection factor tACRTE, and the routine proceeds to step 604.

At step 604, it is determined whether or not the present retard reflection factor tACRTE is larger than 0. When the present retard reflection factor tACRTE is larger than 0, the routine proceeds to step 605 where the present retard reflection factor tACRTE is set to the retard reflection factor ACRTE, and the routine ends. When the present retard reflection factor tACRTE is smaller than 0, the retard reflection factor ACRTE is set to 0, and the routine ends.

The present invention is constituted as described above. When the driver demands a small change in the output, the ignition timing is slightly changed, making it possible to avoid a change in the output that is not intended by the driver.

When the driver demands a large change in the output, on the other hand, the ignition timing is quickly changed making it possible to obtain a change as desired. In either case, there does not take place a change that is not intended by the driver.

I claim:

1. A device for controlling ignition timing of an internal combustion engine comprising:

an operating condition detecting means for detecting operating condition of the engine, said operating condition detecting means including demand level detecting means for detecting level of operator's demand for output;

an ignition timing calculating means for calculating ignition timing based upon detected operating condition of the engine, and an ignition timing adjusting means for adjusting ignition timing to calculated ignition timing, said ignition timing adjusting means adjusts ignition timing quickly when said demand level detecting means detects that the operator demands a large change of output, and adjusts ignition timing slowly when said demand level detecting means detects that the operator demands a small change of output.

2. A device for controlling ignition timing according to claim 1, wherein said demand output level detecting means is a load detecting means for detecting a load on the engine.

3. A device for controlling ignition timing according to claim 2, wherein said load detecting means is means for detecting a pressure of intake passage.

4. A device for controlling ignition timing according to claim 2, wherein said load detecting means is means for detecting an amount of intake air.

5. A device for controlling ignition timing according to claim 2, wherein said load detecting means is means for detecting a throttle valve opening angle.

6. A device for controlling ignition timing according to claim 2, wherein said operation condition detecting means further includes means for detecting engine speed and means for detecting engine temperature, and said ignition timing calculating means calculates ignition timing as follows;
(1) find basic ignition timing based upon engine speed and load,
(2) find required retard angle based upon engine temperature and load,
(3) find target ignition timing based upon basic ignition timing and required retard angle,
(4) compare target ignition timing with previous practical ignition timing,
(5) calculates advancing angle to advance the ignition timing from the previous practical ignition timing to the target ignition timing in accordance with the amount of the load change in such a manner that the advancing angle is small when the load change is small and the advancing angle is large when the load change is large, if the target ignition timing is more advanced than the previous practical ignition timing.

said ignition timing adjusting means advances the ignition timing from the previous practical ignition timing to the target ignition timing by said calculated advancing angle.

7. A device for controlling ignition timing according to claim 6, wherein said device further comprising means for determining whether the engine is idling or non-idling, and said ignition timing calculating means calculates ignition timing separately for idling and non-idling.

8. A device for controlling ignition timing according to claim 6, wherein said means for detecting engine temperature is a engine coolant temperature detecting means.

* * * * *